United States Patent [19]

Wagener et al.

[11] Patent Number: 5,793,028
[45] Date of Patent: Aug. 11, 1998

[54] ELECTRONIC TRANSACTION SECURITY SYSTEM

[75] Inventors: Carl S. Wagener, Parkmore, South Africa; Fred N. Gratzon, 809 S. Second St., Fairfield, Iowa 52556

[73] Assignee: Fred N. Gratzon, Fairfield, Iowa

[21] Appl. No.: 669,084

[22] Filed: Jun. 24, 1996

[51] Int. Cl.⁶ .................................................. G06K 5/00
[52] U.S. Cl. .......................................... 235/380; 235/379
[58] Field of Search .................................. 235/379, 380

[56] References Cited

U.S. PATENT DOCUMENTS

| | | | |
|---|---|---|---|
| 4,614,861 | 9/1986 | Paulov | 235/380 |
| 5,130,519 | 7/1992 | Bush et al. | 235/380 |
| 5,237,609 | 8/1993 | Kimura | 235/380 |
| 5,559,887 | 9/1996 | Davis et al. | 235/380 |

*Primary Examiner*—Harold Pitts
*Attorney, Agent, or Firm*—Dunlap & Codding, PC

[57] ABSTRACT

The present invention relates to an electronic transaction security system for executing an electronic transaction between a transaction or having an individualized transaction identification code and a transactionee. A transaction initiation request is inputted into a transactionor computer associated with the transactionor. The transaction initiation request requests the electronic transaction and includes the transaction identification code. The transaction request is transmitted electronically from the transactionor computer to a transactionee computer associated with the transactionee. In response thereto, the transactionee computer transmits electronically a verification request requesting validation of the transaction initiation request to the transactionor computer. The transactionor computer receives the verification request and transmits electronically a verification response indicating one of a valid transaction and an invalid transaction to the transactionee computer. Finally, the transactionee computer receives the transaction verification response and executes the electronic transaction in response to receiving the verification response indicating a valid transaction, and denies the electronic transaction in response to receiving the verification response indicating an invalid transaction.

7 Claims, 2 Drawing Sheets

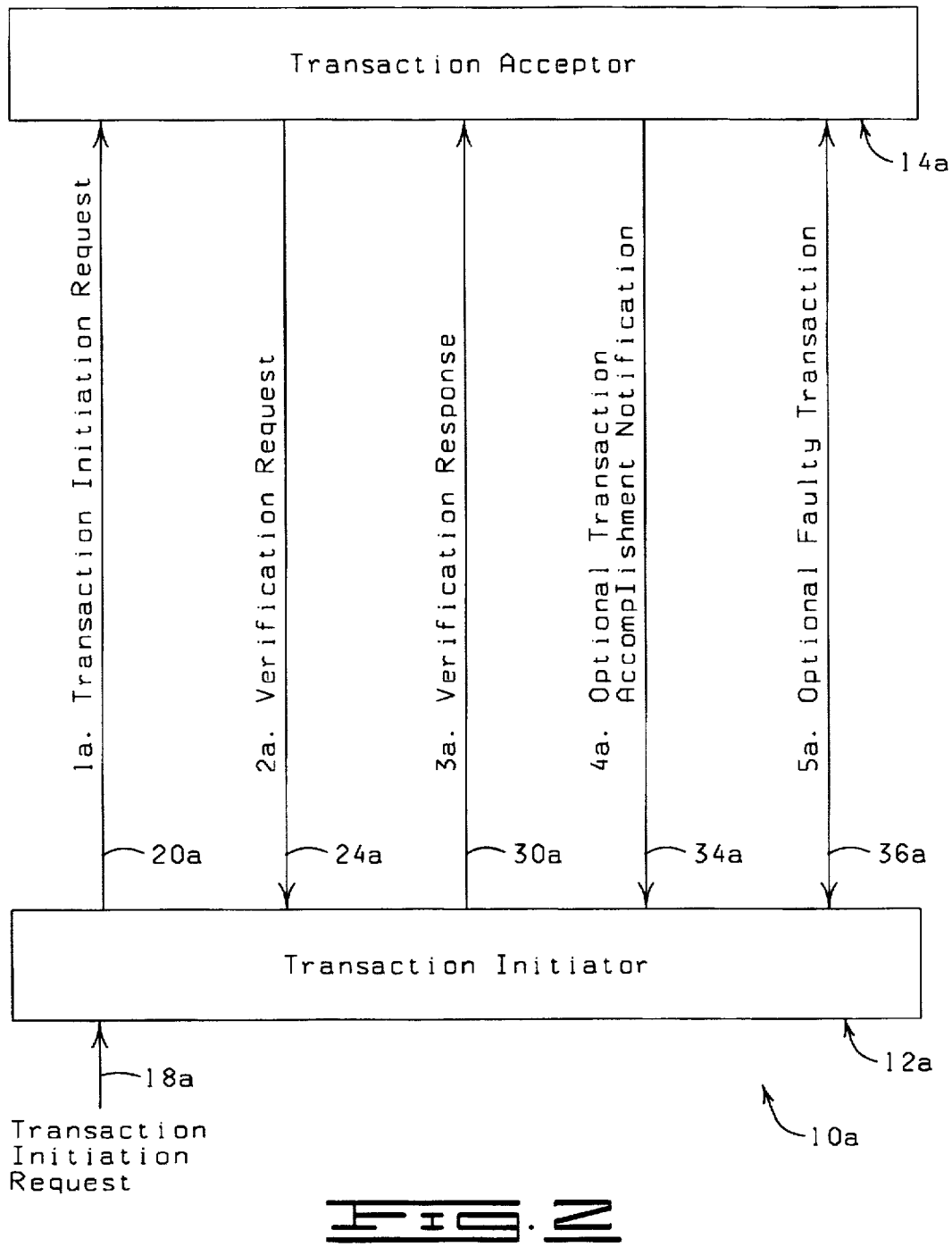

ELECTRONIC TRANSACTION SECURITY SYSTEM

FIELD OF THE INVENTION

The present invention relates generally to electronic transaction security systems and, more particularly, but not by way of limitation to:

a) an electronic transaction security system wherein each electronic transaction is verified by transmitting a verification request from a transaction accepting computer system, to a transaction initiating computer system, possibly by way of a transaction verifying computer system, for verification prior to completing the electronic transaction;

b) an electronic transaction security system wherein each electronic transaction initiated by a transaction initiating computer system is validated and then stored within a third-party system before being transmitted to a transaction accepting computer system, whereby the transaction accepting computer system or some other party is enabled to verify at that time or some future time, that the transaction was transmitted from an identified party, received by an identified party at a certain time, and that the transaction contents were complete and, unmodified.

BACKGROUND

Electronic transactions such as those which occur when a transaction initiating computer system (Transactionor) orders a particular item from a transaction accepting computer system (Transactionee) over the Internet, for example, are becoming commonplace. In such a transaction, the Transactionor commonly orders the item and provides the Transactionee with the Transactionor's credit card number. The credit card number is used by the Transactionee to verify the Transactionor's credit limit, and to verify that the Transactionor can in fact use the credit card to execute the particular electronic transaction or, in other words, to verify that the Transactionor's credit card is effective and unexpired. If an unauthorized person obtains the Transactionor's credit card number, the unauthorized person can use the credit card number in placing unauthorized transaction requests. The electronic transaction security system of the present invention is designed to substantially prevent the unauthorized use of transaction identification codes such as credit card numbers for placing transaction requests electronically via any suitable communication link, such as the Internet.

In addition, few entities will accept electronic communications, including E-mail and facsimile transmissions as legal documents, because such electronic communications can be altered, and because it is difficult to identify the users of electronic communication systems.

For the foregoing reasons, there is a need for an electronic transaction security system that can prevent the unauthorized use of transaction identification codes while also maintaining the integrity of electronic documents. It is to such an electronic security system that the present invention is directed.

BRIEF DESCRIPTION OF THE DRAWINGS

FIG. 2 is an schematic, diagrammatic view of another embodiment of an electronic transaction security system operating in accordance with the present invention.

DETAILED DESCRIPTION

Definitions of Terms

Transactionor AND Transactionee

Figure 1:
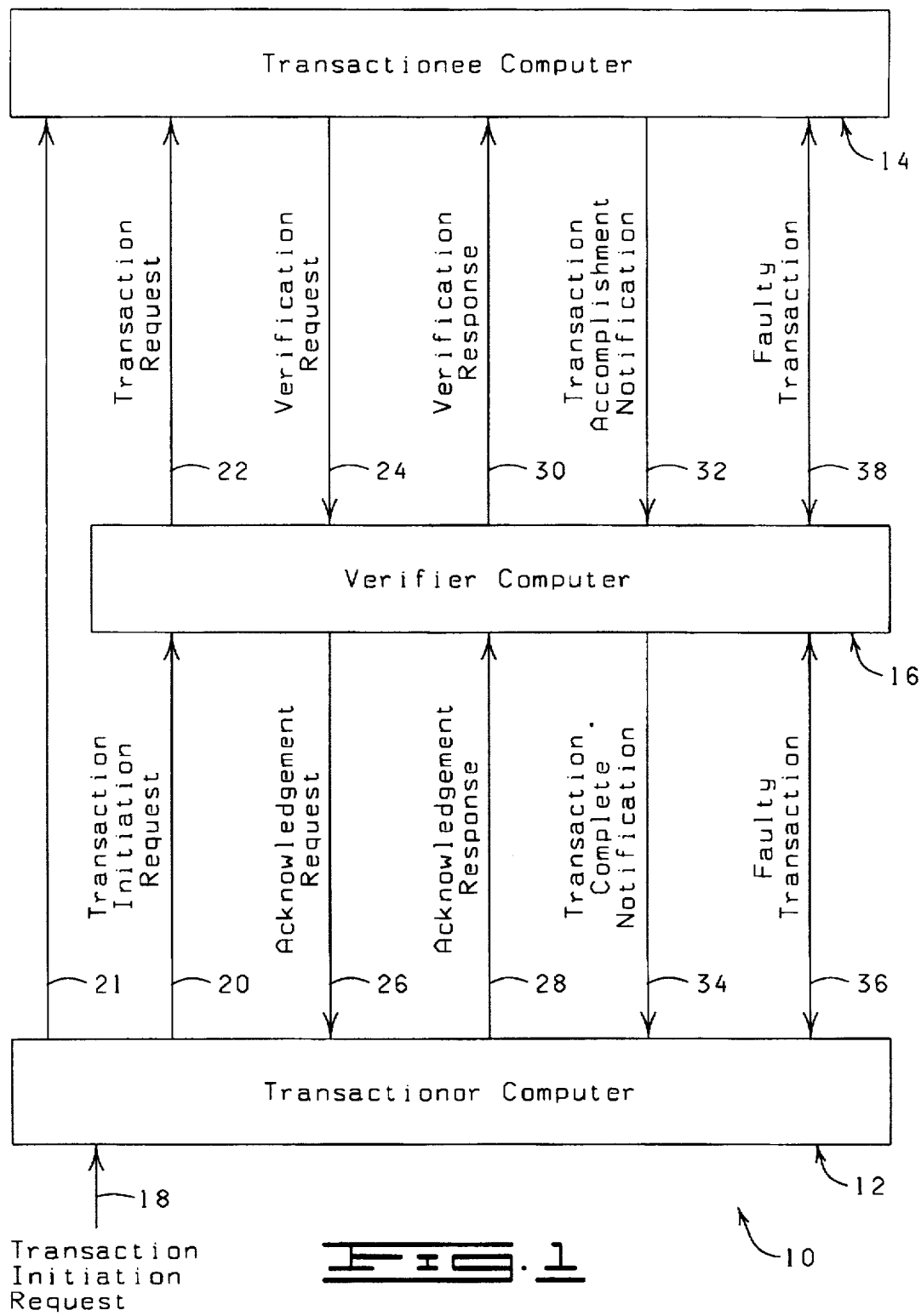
FIG. 1 is a schematic, diagrammatic view of an electronic transaction security system operating in accordance with the present invention.

It should be noted that the terms "Transactionor" and "Transactionee" refer to the parties involved in any one Electronic Transaction. The Transactionor is provided with a transaction initiating computer system (Transactionor computer). The Transactionee is provided with a transaction accepting computer system (Transactionee computer) A single or multiple computer systems may act as the Transactionor computer and/or as the Transactionee computer at different times.

Transactionor

The term "Transactionor" as used herein means an individual, company or other entity (including notional entities such as computer systems), "desiring" to execute or initiate an Electronic Transaction such as ordering an item from a Transactionee, or transferring money from the Transactionor's savings account to the Transactionor's checking account or transferring money from the Transactionor's account in the Transactionee's bank to another account in another bank, or transferring other information requiring reliable traceable communications, such as transferring patient care instructions from a medical practitioner to a nursing entity within a hospital environment.

Transactionee

The term "Transactionee" as used herein means an individual, company or other entity (including notional entities such as computer systems) which can be requested to execute, process or deliver an Electronic Transaction, including systems where the action triggered by receipt of the Electronic Transaction is action at a distance via some other communication method.

Electronic Transaction

The term "Electronic Transaction" as used herein means a transaction between two parties, a Transactionor and a Transactionee, which is requested and/or transmitted and/or delivered and/or executed electronically. According to the requirements of the implementation of the system described herein, this Electronic Transaction may be broken into a number of smaller transactions which will accomplish the effect of the steps identified in the drawings.

Verifier

The term "Verifier" or "Verifier computer" as used herein means an individual, company or other entity (including notional entities such as computer systems) which can embed, or can communicate with systems which embed the information and/or processes required to validate transactions together with the procedural capability to perform such validation. It should be noted that in this document the Verifier is sometimes reflected as a separate entity. But it should be understood that the Verifier may be embedded or partially embedded within the Transactionor computer and/ or the Transactionee computer.

Computer System AND Computer AND Programmed Logic Systems

The term "Computer System" and "Computer" and "Programmed Logic Systems" as used herein means a system or systems which are able to embody and/or execute the logic of the processes described herein. The logic embodied in the form of software instructions or firmware may be executed on any appropriate hardware which may be a dedicated system or systems, or a general purpose computer system, or distributed processing system, all of which are well understood in the art, and a detailed description of how to make or use such computers is not deemed necessary herein. It should be noted that the Transactionor computer, Transactionee computer and Verifier computer as described herein may be embedded within a single computer or programmed logic system, or be implemented as separate computers or programmed logic systems, or be executed on multiple systems using any of the distributed processing models as are well understood in the art, or be implemented using any mixture of the above.

Internet AND Communication Link

The terms "internet" and/or "communication link" refer to any suitable communication link which permit electronic communications. It should be understood that the term "internet" is not limited to "the Internet" or any other particular system or type of communication link. That is, the term "internet" is intended only to refer to any suitable communication system, including extra-computer system and intra-computer system communications. Examples of such communications systems include internal busses, local area networks, wide area networks, point-to-point shared and dedicated communications, infra-red links, microwave links, telephone links, CATV links, Satellite and radio links and fibre-optic links. The terms "internet" and/or "communication link" can also refer to any suitable communication system for sending messages between remote locations, directly or via a third party communication provider such as AT&T. In this instance, messages can be communicated via telephone or facsimile or computer synthesized voice telephone messages with or without voice or tone recognition, or any other suitable communications technique.

It should be understood that each of the communication links are shown and described separately herein for the sole purpose of clearly illustrating the information being communicated between the Transactionor computer, the Transactionee computer and the Verifier computer. In operation, the communication links may not be separate communication links but may be a single communication link.

Identification Codes

Each Transactionor and Transactionee will have individualized Transaction Identification Codes which are uniquely associated with, or identify that particular Transactionor and Transactionee, and are different than those Transaction Identification Codes associated with or identifying other Transactionors and Transactionees. The Transaction Identification Code may be any account number suitable for identifying a particular Transactionor and Transactionee, such as a credit card or vendor number issued by any credit card company, such as VISA, MASTERCARD or AMERICAN EXPRESS for use with any transaction.

In a preferred embodiment, it is contemplated that each individual Transactionor and Transactionee be provided with two Transaction Identification Codes (one for public distribution i.e. addressing (Public Identification Code), and one only used for communication with the Verifier (Private Identification Code)). In the financially oriented example given above, the Transaction Identification Codes would be used solely for executing Electronic Transactions, with only the Verifier having a means of linking the Transactionor and Transactionee Transaction Identification Codes to particular accounts.

The Public Identification Code may be a publicly available code or address such as an IP address or URL, which could be stored in the Verifier, or be communicated between the parties to an Electronic Transaction by any suitable method known in the art. Examples of such methods include but are not limited to: incorporating the Public Identification Codes in the Transaction Initiation Request/Transaction Request and Verification/Acknowledgement Request; associating the Transaction Verification Request address with the Transaction Identification Code associated with the parties by means of a transformation, mapping or encryption process (and using those addresses throughout the transaction sequence); or storing the Transaction Verification addresses on one or more of the involved computers prior to the Electronic Transaction, by associating the addresses with pre-existing accounts.

Authorization Codes

Each Transactionor, Verifier and Transactionee will have an "Authorization Code" which may be a single constant code (like an account number) or a sequence of codes which will be generated using a predetermined strategy. In either case, these codes will also uniquely identify the user using a mapping process known only to the Verifier. Authorization Codes may take the form of a password entered into or stored within the Transactionor computer, for example, in any suitable manner known in the art such as digital signature technology, unique customer coded hardware or software, the use of public/private key encryption techniques, the use of serialization techniques or any other suitable form to reduce the risk of Authorization Codes becoming publicly available.

Not Acknowledged Action

Any time a transaction test indicates an invalid Electronic Transaction, the entity detecting the result may repeat the previous action (assuming a transfer error), abort or cancel the Electronic Transaction, return or propagate a Not Acknowledged/Not Verified result to the Transactionee computer, or not take any further action.

Description of Process (Referring to FIG. 1)

Shown in FIG. 1 is an electronic transaction security system 10 for executing Electronic Transactions between a plurality of Transaction issuers (Transactionors) and a plurality of Transaction acceptors (Transactionees) via a plurality of Transaction Verifiers (Verifiers) which operates in accordance with the present invention. Each of the Transactionors has a Transactionor computer 12 which is usually located at the Transactionor's home or office. Each of the Transactionor computers 12 is associated with one of the Transactionors, or in other words, identifies a specific Transactionor during an Electronic Transaction. Only one Transactionor computer 12 is shown in FIG. 1 for purposes of clarity. Each of the Transactionees has a Transactionee computer 14 which is usually located at the Transactionee's home or business. Each of the Transactionee computers 14 is associated with one of the Transactionees, or in other words, identifies a specific Transactionee during an Electronic Transaction. Only one Transactionee computer 14 is shown in FIG. 1 for purposes of clarity. Each of the Verifiers has a Verifier computer 16 which is usually located at the Verifier's home or business. Each of the Verifier computers 16 is associated with one of the Verifiers, or in other words, identifies a specific Verifier during an Electronic Transaction. Only one Verifier computer 16 is shown in FIG. 1 for purposes of clarity. The Transactionor computer 12, the Transactionee computer 14, and the Verifier computer 16 can each be any suitable computer or computer system as discussed hereinbefore.

In the following description, it should be noted that each communication between the entities (the Transactionor computer 12, the Transactionee computer 14 and the Verifier computer 16) involved in a particular Electronic Transaction may be triggered automatically, for example, by means of a sequential logic process, or through a time schedule system, or alternatively may require a manual intervention to trigger the next phase of an Electronic Transaction. Each of the Transactionor computer 12, the Transactionee computer 14 and the Verifier computer 16 may exist as a single programmed logic system, or as a distributed logic system. While the Verifier computer 16 is reflected as a separate entity, it should be understood that the Verifier computer 16 may be implemented in such a fashion that part or all of its logic is embedded within either the Transactionor computer 12 or the Transactionee computer 14.

Transaction Initiation Request

When the Transactionor desires to execute a predetermined or particular Electronic Transaction, with a predetermined or identified Transactionee, the Transactionor would input a Transaction Initiation Request requesting the initiation of an Electronic Transaction into the Transactionor computer 12 via any suitable input device 18 (the input device is represented in FIG. 1 as the arrow 18). The input device 18 can be any input device capable of inputting information into the Transactionor computer 12, such as a keyboard, a scanner, a mouse, a modem, a network adapter, a voice input device, a remote computer or the like. In response to receiving the Transaction Initiation Request, the Transactionor computer 12 stores the Transaction Initiation Request and establishes electronic contact with the Verifier computer 16 via a communication link 20. The Transactionor computer 12 then electronically transmits the Transaction Initiation Request to the Verifier computer 16 via the communication link 20. The Verifier computer 16 stores the contents of the Transaction Initiation Request for use in later validation.

The Transaction Initiation Request transmitted between the Transactionor computer 12 and the Verifier computer 16 typically contains the following information:

Transaction Type
Transactionor Public Identification Code
Transactionor Transaction Reference
Transactionee Public Identification Code
Processable Data Attachments e.g. Transaction Value
Optional Data Attachments e.g. Item/Service Description, Transaction Quantity It should be noted that in some embodiments of the present invention, the Transaction Initiation Request may not be transmitted to the Verifier computer 16, but instead may be transmitted to the Transactionee computer 14 via a communication link 21.

Transaction Request

The Verifier computer 16 stores and transforms the Transaction Initiation Request into a Transaction Request requesting processing of the Electronic Transaction. The Transaction Request is transmitted from the Verifier computer 16 to the Transactionee computer 14 via a communication link 22 in response to the Verifier computer 16 receiving the Transaction Initiation Request. Of course, when the Transaction Initiation Request is transmitted to the Transactionee computer 14 from the Transactionor computer 12 over the communication link 21, the Verifier computer 16 will not transmit a Transaction Request to the Transactionee computer 14. The Transaction Request typically contains the following information:

Verifier Public Identification Code
Transaction Type
Verifier Transaction Reference
Transactionee Public Identification Code
Transactionor Public Identification Code
Processable Data Attachments e.g. Transaction Value
Optional Data Attachments e.g. Item/Service Description, Transaction Quantity Verification Request The Transactionee computer 14 receives the Transaction Request and in response thereto, the Transactionee computer 14 stores the Transaction Request and formulates a Verification Request. This Verification Request is transmitted by the Transactionee computer 14 to the Verifier computer 16 via a communication link 24. The Verification Request typically contains the following information:

Transaction Type
Transactionee Private Identification Code
Transactionee Transaction Reference
Transactionee Authorization Code
Verifier Public Identification Code
Verifier Transaction Reference
Processable Data Attachments e.g. Transaction Value
Optional Data Attachments It should be noted that the information relating to the Verifier Transaction Reference is only present in the Verification Request if the Transaction Initiation Request was transmitted to the Verifier computer 16 via the communication link 20.

Acknowledgement Request

The Verification Request is received by the Verifier computer 16. In response thereto, the Verifier computer 16 transforms the Verification Request into an Acknowledgement Request requesting acknowledgement of the Electronic Transaction. The Acknowledgement Request is then transmitted from the Verifier computer 16 to the Transactionor computer 12 via a communication link 26. The Acknowledgement Request typically contains the following information:

Transaction Type
Verifier Public Identification Code
Verifier Transaction Reference
Transactionor Public Identification Code
Transactionor Transaction Reference
Processable Data Attachments e.g. Transaction Value
Optional Data Attachments Acknowledgement Response In response to the receipt of the Acknowledgement Request, the Transactionor computer 12 may perform a number of internal validity checks, for example, that the Electronic Transaction is valid (i.e. corresponds to the Transaction Initiation Request formulated by the Transactionor) ; that the Electronic Transaction is authorized; and that funds are available. After determining the validity of the Electronic Transaction, the Transactionor computer 12 acknowledges (or not), the validity of the Electronic Transaction in the form of an Acknowledgement Response. The Acknowledgement Response is stored by the Transactionor computer 12 and then transmitted to the Verifier computer 16 via a communication link 28. The Acknowledgement Response may take the form of a value or password entered into the Transactionor computer 12 by the Transactionor on receipt of the Acknowledgement Request, or it may be stored within the Transactionor computer 12 in any suitable manner known in the art, or it may be generated in some fashion known to the art, using a system designed to produce values the Verifier computer 16 is able to recognize as valid, or some combination of the above, possibly with the added security offered through the use of digital signature technology, unique customer coded hardware or software, the use of public/private key encryption techniques or any other suitable form to assure that the Acknowledgement Response is issued by the Transactionor whose Transaction Identification Code is being utilized to execute the Electronic Transaction so that an unauthorized individual cannot use the Transactionor Identification Code to execute unauthorized Electronic Transactions. In the event of a Not Acknowledged Transaction, the Transactionor computer 12 may take any Not Acknowledged Action as discussed above. A positive Acknowledgement Response transmitted from the Transactionor computer 12 to the Verifier computer 16 typically contains the following information:

Transaction Type

Transactionor Private Identification Code

Verifier's Transaction Reference

Transactionor's Authorization Code

Other Verification and Validation

The Acknowledgement Response is received and stored by the Verifier computer 16. In response thereto, the Verifier computer 16 may perform other tests on the validity of the transaction. These tests include, but are not limited to:

- ensuring that all the Transaction Identification Codes are valid.
- ensuring that the accounts referred to in the Transaction Identification Codes are valid and usable for the Electronic Transaction.
- ensuring that the conditions attached to the accounts used are honored, e.g. funds are available.
- ensuring that alterations in attached processable and optional Data Attachments are limited to those allowed by the system, by testing communicated data against data stored in the Verifier computer 16 or elsewhere.

In the event that the Verifier computer 16 declines an Electronic Transaction, the Verifier computer 16 may take any Not Acknowledged Actions.

In the preferred embodiment, any other validation such as those suggested above will occur at this time, as complete information about the Electronic Transaction including the validity of the Electronic Transaction is available to the Verifier computer 16.

Other activities triggered by a valid transaction could also be performed at this time, for example a transfer of funds from a Transactionor to a Transactionee account could be performed at this time, e.g. payment on order.

Verification Response

Assuming that any other conditions as described under Other Verification and Validation above are met, the Verifier computer 16 will transform an incoming positive Acknowledgement Response into a positive Verification Response. The Verification Response is stored and then transmitted to the Transactionee computer 14 via a communication link 30. The Transactionee computer 14 receives and stores the Verification Response. If the Verification Response indicates that the Electronic Transaction is a valid transaction, then the Transactionee computer 14 executes such Electronic Transaction. The Verification Response typically contains the following information:

Transaction Type

Transactionee Public Identification Code

Transactionee Transaction Reference

Verifier's Authorization Code

Verifier's Public Identification Code

The Verifier's Authorization Code may take the form of a password entered into or stored within the Verifier computer 16 in any suitable manner known in the art, digital signature technology, unique customer coded hardware or software, the use of public/private key encryption techniques or any other suitable form to assure that the Verification Response is issued by the Verifier performing the transaction processing, so that an unauthorized individual cannot use the Verifier's public and private Identification Codes to execute unauthorized Electronic Transactions. The Verifier's Transaction Reference and Authorization Code will typically be stored by the Transactionee computer 14 for a predetermined period of time so as to maintain a record of the verification (or denial) of the transaction.

Optional Transaction Accomplishment Notification

In some circumstances, for example, where a transfer of funds will only occur on shipment of goods, an additional step may be required before an Electronic Transaction can be completed. This is where the Transactionee computer 14 is required to complete some operations which may only be initiated once verification of the Electronic Transaction is accomplished by the Transactionor computer 12 and the Verifier computer 16. In this embodiment, the Transactionee computer 14 will perform whatever operations are required before signalling to the Verifier computer 16 that it has completed such operations. When the Transactionee computer 14 has completed the required operations, the Transactionee computer 14 transmits a Transaction Accomplishment Notification to the Verifier computer 16 via a communication link 32 to notify the Verifier computer 16 that the Transactionee computer 14 has completed the operations pursuant to the Electronic Transaction. This Transaction Accomplishment Notification typically contains the following information:

Transaction Type

Transactionee Private Identification Code

Verifier Public Identification Code

Verifier Transaction Reference

Processable Data Attachments e.g. Shipping Date

Optional Data Attachments

It should be noted that the Verifier computer 16 may perform additional checking before acting on a Transaction Accomplishment Notification. For example, the Processable Data Attachments may contain a "latest acceptable shipping date" as is found in International Letters of Credit, and if this date were incorrect, the Verifier computer 16 may decline the Transaction.

Optional Transaction Complete Notification

The Verifier computer 16 transforms a received Transaction Accomplishment Notification into a Transaction Complete Notification which is transmitted to the Transactionor computer 12 via a communication link 34, signifying completion of an Electronic Transaction. This Optional Transaction Complete Notification typically includes the following information:

Transaction Type

Verifier Public Identification Code

Transactionor Public Identification Code

Transactionor Transaction Reference

Processable Data Attachments e.g. Transaction Value

Optional Data Attachments

Faulty Transaction Request AND Faulty Transaction Reporting

The Verifier computer 16 may issue a Faulty Transaction Request to the Transactionor computer 12 and/or the Transactionee computer 14 via communication links 36 and 38, respectively, to retrieve information pertaining to incomplete or faulty transactions, in order to build a model of faulty transaction patterns. Alternatively, the Transactionor computer 12 and/or the Transactionee computer 14 may automatically upload information pertaining to incomplete or faulty transactions to the Verifier computer 16.

Another approach may be to include information concerning Faulty Transaction Reporting with the other transaction data when normal Electronic Transactions occur as described above.

Benefits

Each Transactionor and Transactionee has no knowledge of other Transactionor or Transactionee Private Identification Codes. That is, the Transactionor computer 12 and the Transactionee computer 14 only access other Transactionors and Transactionees using their Public Identification Codes. The Verifier and the Verifier computer 16 are the only entities with the capacity to map between the Private and Public Codes, but the Verifier computer 16 is unable to initiate Electronic Transactions. In addition, the Transactionee has no knowledge of the Transactionor's Authorization Code, as it is never passed to the Transactionee computer 14 by the Verifier computer 16, and the Transactionor has no knowledge of the Verifier's Authorization Code, as it is never passed to the Transactionor computer 12 by the Verifier computer 16. In addition, in the preferred embodiment, the Verifier's Authorization Code will be different for each Electronic Transaction with a particular Transactionee.

While an unauthorized entity may obtain other entities' Private Identification Codes, and could even conceivably possess access to appropriate Transaction Authorization Codes (through monitoring communications or obtaining access to the logic and data storage of the Verifier computer 16 in some way), this would still not permit the entry of fraudulent Electronic Transactions, as the Electronic Transactions would be confirmed by communications with the addresses linked to the use of such codes, which would of course, not have a record of such Electronic Transactions and thus could not confirm the fraudulent Electronic Transactions.

It may be noted that the Verifier computer 16 of the Electronic Transaction security system 10 can store each of the transmissions between the Transactionor computer 12, the Verifier computer 16 and the Transactionee computer 14 to provide the system 10 with a complete Electronic Transaction history, analysis and auditing facilities. The system 10 will scale well using a variety of computer technologies, and is capable of providing complete security against intrusion from unauthorized on-line attack, through the use of conventional electronic fire-wall technologies as are well understood in the art.

Disadvantages

The volume of data handled in providing the Electronic Transaction history could make single medium direct access storage of the Electronic Transactions at the Verifier computer 16 an expensive option, resulting in the need for the institution of hierarchical storage facilities, with commensurate complications.

When it is not essential to provide a complete Electronic Transaction history, the Verifier computer 16 may not have the ability to store complete Electronic Transaction details and thus may not be able to perform validation steps which rely on access to historical data. In this case, the Verifier computer 16 will only store and thereby permit auditing of Transaction Accomplishment Notifications, although other data may be stored. It should be noted that partial audits are possible by examining log files from the Transactionor computer 12 and the Transactionee computer 14 because the Transactionor computer 12 stores the Transaction Initiation Request, the Acknowledgement Response and the Transaction Complete Notification and the Transactionee computer 14 stores the Transaction Request and the Verification Response.

Examples of Other Embodiments

The Electronic Transaction security system 10 can be used for executing verifiable electronic document transfers between the Transactionor computer 12 and the Transactionee computer 14. In this embodiment the Verifier computer 16 acts primarily as a storage mechanism for documents, with appropriate error correction or detection mechanisms together with appropriate security and retrieval systems, as are well understood in the industry.

In this embodiment, when the Transactionor desires to transfer a document or other item suitable for transmission by electronic communication, with a predetermined or identified Transactionee, the Transactionor initially inputs the document into the Transactionor computer 12 via the input device 18 (Transaction Initiation Request). The Transactionor computer 12 then establishes communication with the Verifier computer 16, through any suitable communications link and transmits the Transaction Initiation Request (document) to the Verifier computer 16 via the communication link 20.

The Transaction Initiation Request typically contains the following information:

Transaction Type

Transactionor Private Identification Code

Transactionor Document Reference

Transactionee Public Identification Code

Processable Data Attachments e.g. Document Type

Optional Data Attachments e.g. Encoded Document or other items

The Verifier computer 16 stores the Transaction Initiation Request (document) and then transmits a Transaction Request to the Transactionee computer 14 via the communication link 22. The Transaction Request typically contains the following information:

Transaction Type

Verifier Public Identification Code

Verifier Document Reference

Transactionee Public Identification Code

Transactionor Public Identification Code

Transactionor Document Reference

Processable Data Attachments e.g. Document Type

Optional Data Attachments e.g. Encoded Document or other items

In response to the receipt of the Transaction Initiation Request described above, the Transactionee computer 14 formulates a Verification Request requesting verification of the Transaction Request. Depending on the system implementation requirements, the Transactionee may be required to enter an Authorization Code before the contents are made available to the Transactionee computer 14. In this case the Processable or Optional Data Attachments may include an Authorization Code. The Verification Request will be forwarded by the Transactionee computer 14 to the Verifier computer 16 via the communication link 24. The Verification Request typically contains the following information:

Transaction Type

Transactionee Private Identification Code

Transactionee Transaction Reference

Verifier Public Identification Code

Verifier Transaction Reference

Processable Data Attachments e.g. Authorization Code, Checksum, Digital Signature or other means of detecting changes to the Encoded Document or other items Optional Data Attachments e.g. for critical communications, a copy of the original document as received by the Transactionee.

The Verifier computer 16 transforms the incoming data from the Transactionee into an Acknowledgement Request and transmits the Acknowledgement Request to the Transactionor computer 12 via the communication link 26. The Acknowledgement Request typically contains the following information:

Transaction Type

Transactionor Public Identification Code

Transactionor Transaction Reference

Verifier Public Identification Code

Verifier Transaction Reference

Transactionee Public Identification Code

Transactionee Transaction Reference

Processable Data Attachments e.g. Authorization Code, Checksum, Digital Signature or other means of detecting changes to the Encoded Document or other items Optional Data Attachments e.g. for critical communications, a copy of the original document as received by the Transactionee.

In response to the receipt of the Acknowledgement Request, the Transactionor computer 12 performs a number of internal validity checks, for example, that the received message matches a message originally transmitted by the Transactionor computer, and that the correct Transactionee computer 14 has received the documents contained in the Transaction Request.

After determining the validity of the Electronic Transaction, the Transactionor computer 12 acknowledges (or not), the validity of the Electronic Transaction in the form of an Acknowledgement Response to the Verifier computer 16. This Acknowledgement Response may take the form of a value or password entered into the Transactionor computer 12 by an operator on receipt of the Acknowledgement Request, or it may be stored within the Transactionor computer 12 in any suitable manner known in the art, or it may be generated in some fashion known in the art, using a system designed to produce values the Verifier computer 16 is able to recognize as valid, or some combination of the above, possibly with the added security offered through the use of digital signature technology, unique customer coded hardware or software, the use of public/private key encryption techniques or any other suitable form to assure that the Acknowledgement Response is issued by the Transactionor whose Transaction Identification Code is being utilized to execute the Electronic Transaction, so that an unauthorized individual cannot use the Transactionor's Transaction Identification Codes to execute unauthorized Electronic Transactions. A positive Acknowledgement Response from the Transactionor computer 12 to the Verifier computer 16 typically contain the following information:

Transaction Type

Transactionor Private Identification Code

Verifier's Transaction Reference

Transactionee's Authorization Code

At any time between the Transaction Initiation Request and the Verification Response, the Verifier computer 16 may perform other tests on the validity of the Electronic Transaction. These tests may include, but are not limited to:

ensuring that all the Transaction Identification Codes are valid.

at the discretion of the implementor, check that the data received from the Transactionee computer 14 matches that stored by the Verifier computer 16, and if a mismatch is detected take a Not Verified Action.

check the validity of the Transaction Authorization Code or Codes if this is required.

ensuring that alterations in attached processable and optional Data Attachments are limited to those allowed by the system 10, by testing communicated data against data stored in the Verifier computer 16 or elsewhere.

The Verifier computer 16 may decline to forward transactions, or may cancel Electronic Transactions in progress, or may refuse to verify Electronic Transactions based on the results of such tests. In this embodiment, any other validation such as suggested above occurs at this time, as complete information about the Electronic Transaction including the validity of the Electronic Transaction is available to the Verifier computer 16. Other activities triggered by a valid transaction could also be performed at this time, for example a transfer of funds from a Transactionee account could also be performed at this time, e.g. payment on delivery of documents.

Assuming that the conditions described above are met, the Verifier computer 16 transforms an incoming positive Acknowledgement Response into a positive Verification Response which is transmitted to the Transactionee computer 14 via the communication link 30. The Verification Response typically contains the following information:

Transaction Type

Transactionee Public Identification Code

Transactionee Transaction Reference

Verifier's Authorization Code

The Verifier's Authorization Code may take the form of a password entered into or stored within the Verifier computer 16 in any suitable manner known in the art, digital signature technology, unique customer coded hardware or software, the use of public/private key encryption techniques or any other suitable form to assure that the Verification Response is issued by the Verifier computer 16 performing the Electronic Transaction processing, so that an unauthorized individual cannot use the Verifier Identification Code to execute unauthorized Electronic Transactions. The Verifier Transaction Reference and Authorization Code will typically be stored by the Transactionee computer 14 for a predetermined period of time so as to maintain a record of the verification (or denial) of the transaction.

The Verifier computer 16 may issue a request over the communication links 36 and 38 to the Transactionor computers 12 and/or the Transactionee computers 14 to retrieve information pertaining to incomplete or faulty transactions, in order to build a model of faulty transaction patterns. Alternatively, the Transactionor computers 12 and/or the Transactionee computers 14 may automatically upload information pertaining to incomplete or faulty transactions to the Verifier computer 16.

Another approach may be to include Faulty Transaction Reporting with other transaction data when normal transactions occur.

This embodiment represents a customization of the system 10 which can provide complete tracking of a document or other information transfer, with auditability together with the ability (by retrieving a copy of the document) to prove at some later stage that a document or other information was transmitted and received in a certain format.

In one other embodiment, a Transaction Initiation Request requesting the initiation of an Electronic Transaction is inputted into the Transactionor computer 12. The Transaction Initiation Request is stored by the Transactionor computer 12 and then transmitted to the Verifier computer 16 from the Transactionor computer 12. The Transaction Initiation Request includes Transaction Identification Codes uniquely identifying the Transactionor computer 12 and Transaction Identification codes uniquely identifying the Transactionee computer 14.

It should be understood that in this embodiment, the Transaction Identification Codes which describe one of the Transactionor computer 12, the Transactionee computer 14 and the Verifier computer 16 and which are transmitted between the Transactionor computer 12, the Transactionee computer 14 and the Verifier computer 16 could be either Private Identification Codes or Public Identification Codes, but not both the Private and Public Identification Codes. For example, the Transaction Identification Codes uniquely identifying the Transactionor computer 12 may include either the Public Identification Code uniquely identifying the Transactionor computer 12 or the Private Identification Code uniquely identifying the Transactionor computer 12, but not both the Public and Private Identification Codes uniquely identifying the Transactionor computer 12.

The Verifier computer 16 receives and stores the Transaction Initiation Request. The Verifier computer 16 then transmits a Transaction Request requesting processing of the Electronic Transaction from the Verifier computer 16 to the Transactionee computer 14 identified by the Transaction Identification Code in the Transaction Initiation Request in response to the Verifier computer 16 receiving the Transaction Initiation Request. The Transaction Request includes a Transaction Identification Code uniquely identifying the Verifier computer 16.

The Transactionee computer 14 receives and stores the Transaction Request. Then, the Transactionee computer 14 transmits a Verification Request requesting verification of the transaction to the Verifier computer 16 in response to the Transactionee computer 14 receiving the Transaction Request. The Verification Request includes a Transaction Identification Code uniquely identifying the Transactionee computer 14.

The Verifier computer 16 receives the Verification Request and in response thereto, transmits an Acknowledgement Request requesting acknowledgement of the Electronic Transaction from the Verifier computer 16 to the Transactionor computer 12.

The Transactionor computer 12 receives the Acknowledgement Request and in response thereto, stores and transmits an Acknowledgement Response indicating one of a valid Electronic Transaction and an invalid Electronic Transaction to the Verifier computer 16.

The Verifier computer 16 receives and stores the Acknowledgement Response, and in response thereto, transmits a Verification Response indicating one of a valid Electronic Transaction and an invalid Electronic Transaction to the Transactionee computer 14.

The Transactionee computer 14 receives the Verification Response and executes the Electronic Transaction in response to the Verification Response indicating a valid Electronic Transaction.

Description of Process (Referring to FIG. 2)

Shown in FIG. 2 is a modified Electronic Transaction security system 10a which operates exactly like the Electronic Transaction security system 10 shown in FIG. 1, except that the functionality of the Verifier computer 16 is embedded or partially embedded within a Transactionor computer 12a and/or a Transactionee computer 14a.

That is, the system 10a reflected in FIG. 2 operates similarly to the system 10 reflected in FIG. 1 with the exception that the Verifier computer 16 is not identified as a separate entity. As the Verifier computer 16 typically serves to implement the translation of Private to Public Identification Codes, only Public Identification Codes will be specifically described below. However, it should be understood that any Transaction Identification Code, including Private Identification Codes, could be used by the system 10a.

It should be further noted that an equivalent communications structure to that reflected in FIG. 2 could be implemented using the structures reflected in FIG. 1 by embedding the Verifier computer 16 in the Transactionor computer 12 and/or Transactionee computer 14 or in some mixture of the two, and that such a model would allow the use of Public/Private address structures as documented in the Description of Process for FIG. 1.

Transaction Initiation Request

When the Transactionor desires to execute a predetermined or particular Electronic Transaction, with a predetermined or identified Transactionee, the Transactionor inputs a Transaction Initiation Request requesting the initiation of an Electronic Transaction into the Transactionor computer 12a via any suitable input device 18a (the input device is represented in FIG. 2 as the arrow 18a). The input device 18a can be any input device capable of inputting information into the Transactionor computer 12a, such as a keyboard, a scanner, a mouse, a modem, a network adapter, a voice input device, a remote computer or the like. In response to receiving the Transaction Initiation Request, the Transactionor computer 12a stores the Transaction Initiation Request and establishes electronic contact with the Transactionee computer 14a via a communication link 20a. The Transactionor computer 12a then electronically transmits the Transaction Initiation Request to the Transactionee computer 14a via the communication link 20a. The Transactionee computer 14a then stores the contents of the Transaction Initiation Request for use in later validation.

The Transaction Initiation Request transmitted between the Transactionor computer 12a and the Transactionee computer 14a typically contains the following information:

Transaction Type
Transactionor Public Identification Code
Transactionor Transaction Reference
Transactionee Public Identification Code
Processable Data Attachments e.g. Transaction Value
Optional Data Attachments e.g. Item/Service Description, Transaction Quantity Verification Request The Transactionee computer 14a receives the Transaction Initiation Request and in response thereto, the Transactionee computer 14a stores the Transaction Initiation Request and formulates a Verification Request. This Verification Request is transmitted by the Transactionee computer 14a to the Transactionor computer 12a via a communication link 24a. The Verification Request typically contains the following information:

Transaction Type
Transactionee Public Identification Code
Transactionee Transaction Reference
Transactionor Public Identification Code
Transactionor Transaction Reference Processable Data Attachments e.g. Transaction Value Optional Data Attachments Verification Response The Transactionor computer 12a receives the Verification Request and in response thereto, the Transactionor computer 12a checks, for example, that the Electronic Transaction is valid (i.e. corresponds to a Transaction Request formulated by the Transactionor); that the Transaction is authorized; and that funds are available. After determining the validity of the Electronic Transaction, the Transactionor computer 12a acknowledges (or not), the validity of the Electronic Transaction in the form of a Verification Response. The Verification Response is transmitted via the signal path 30a to the Transactionee computer 14a from the Transactionor computer 12a. This acknowledgement may take the form of a value or password entered into the Transactionor computer 12a by the Transactionor on receipt of a Verification Request, or it may be stored within the Transactionor computer 12a in any suitable manner known in the art, or it may be generated in some fashion known to the art, using a system designed to produce values the Transactionee computer 14a is able to recognize as valid, or through some combination of the above, possibly with the added security offered through the use of digital signature technology, unique customer coded hardware or software, the use of public/private key encryption techniques or any other suitable form to assure that the Verification Response is issued by the Transactionor whose Transaction Identification Code is being utilized to execute the Electronic Transaction, so that an unauthorized individual cannot use the Transactionor's Transaction Identification Code to execute unauthorized Electronic Transactions. A positive Verification Response from the Transactionor computer 12a to the Transactionee computer 14a typically contains:

Transaction Type

Transactionor Public Identification Code

Transactionor Authorization Code

Transactionor Transaction Reference

Transactionee Public Identification Code

Transactionee Transaction Reference

The Transactionor Transaction Reference and Authorization Code are typically stored by the Transactionee computer 14a for a predetermined period of time so as to maintain a record of the verification (or denial) of the Electronic Transaction.

Other Verification and Validation

At any time between the Transaction Initiation Request and the Verification Response, the Transactionor computer 12a, and Transactionee computer 14a may perform other tests on the validity of the Electronic Transaction. These tests include, but are not limited to:

ensuring that all the Transaction Identification Codes are valid.

ensuring that the accounts referred to are valid and usable for the transaction.

ensuring that the conditions attached to the accounts used are honored, e.g. funds are available.

ensuring that alterations in attached processable and optional Data Attachments are limited to those allowed by the system, by testing communicated data against data stored in the Transactionee computer 14a or elsewhere.

The Transactionee computer 14a may decline to process Electronic Transactions, or may cancel Electronic Transactions in progress, or may refuse to verify Electronic Transactions based on the results of such tests. In the preferred embodiment, any other validation such as suggested above will occur at this time, as complete information about the Electronic Transaction including the validity of the Electronic Transaction (from the Transactionor computer 12a and the Transactionee computer 14a) will be known to the Transactionee computer 14a. Other activities triggered by a valid Electronic Transaction could also be performed at this time, for example a transfer of funds from a Transactionor to a Transactionee account could be performed at this time, e.g. payment on order.

Optional Transaction Accomplishment Notification

In some circumstances, for example, where a transfer of funds will only occur on shipment of goods, an additional step may be required before an Electronic Transaction can be completed. This is where the Transactionor computer 12a is required to complete some operations which may only be initiated once verification of the Electronic Transaction is accomplished by the Transactionee computer 14a. In this environment, the Transactionee computer 14a will perform whatever operations are required before signalling to the Transactionor computer 12a that it has completed the operations. This operation may be effected as a completely separate Electronic Transaction with the Transactionee computer 14a and the Transactionor computer 12a acting as the Transactionor computer 12a and the Transactionee computer 14a respectively in a new Electronic Transaction. Or, the Transactionee computer 14a may simply notify the Transactionor computer 12a that it has completed the operations pursuant to an Electronic Transaction by transmitting a Transaction Accomplishment Notification to the Transactionor computer 12a via a communication link 34a. The Transaction Accomplishment Notification typically contains the following information:

Transaction Type

Transactionee Public Identification Code

Transactionor Public Identification Code

Transactionor Transaction Reference

Processable Data Attachments e.g. Shipping Date

Optional Data Attachments

Faulty Transaction Request AND Reporting

The Transactionor computers 12a or the Transactionee computers 14a may issue Faulty Transaction Requests to the Transactionee computers 14a or the Transactionor computers 12a via a communication link 36a to retrieve information pertaining to incomplete or faulty transactions, in order to build a model of faulty transaction patterns.

Another approach may be to include information concerning Faulty Transaction Reporting with the other transaction data when normal Electronic Transactions occur as described above.

Benefits

The system 10a shown in FIG. 2 is suited to use in systems which are operated by a primary entity or entities which require the ability to establish an environment where a number of external entities are required to access their systems as Transactionors and/or Transactionees, in order to perform Electronic Transactions, and where the primary entity is able to maintain an adequate degree of security on the data held on their systems.

Examples of Other Embodiments

In one embodiment, the Transactionor may be an individual having a home computer (Transactionor computer 12a) and the Transactionee may be a seller of goods such as books for example having a business computer (Transactionee computer 14a). The individual (Transactionor) may desire to purchase a particular book from the bookseller (Transactionee). The home computer (Transactionor computer 12a) and the business computer (Transactionee computer 14a) are electronically interconnected via a communication link such as the communication link commonly referred to as the internet for example. To execute the purchase, the individual (Transactionor) inputs into the home computer (Transactionor computer 12a) a Transaction Initiation Request which identifies the particular bookseller (Transactionee), the book to be purchased and the individual's credit card number (Transaction Identification Code). The home computer (Transactionor computer 12a) transmits this Transaction Request electronically via the communication link 20a which is then inputted into the business computer (Transactionee computer 14a). The seller (Transactionee) does not initially execute the Transaction Initiation Request, or in other words, does not place the order for the book solely upon receiving the Transaction Initiation Request. Rather, the business computer (Transactionee computer 14a) transmits electronically a Verification Request which may identify the individual ordering the book, the book ordered and a request for the individual (Transactionor) to verify that the order in fact was placed by the individual (Transactionor). Upon receiving the Transaction Verification Request, the home computer (Transactionor computer 12a) transmits a Verification Response either verifying the Transaction Initiation Request (indicating a valid transaction) or not verifying the Transaction Initiation Request (indicating an invalid transaction). Upon receiving the Verification Response verifying the Transaction Initiation Request was made by the individual (Transactionor) or at the home computer (Transactionor computer 12a), the business computer (Transactionee computer 14a) executes the Electronic Transaction included in the Transaction Initiation Request.

In one other embodiment, the Verification Request transmitted by the Transactionee computer 14a may be in the form of an E-mail message addressed to the Public Identification Code uniquely identifying the Transactionor, which is typically the E-mail address of the Transactionor computer 12a. When the Transactionor receives the message included in the Verification Request, the Transactionor inputs the Verification Response into the Transactionor computer 12a and the Verification Response then is transmitted by the Transactionor computer 12a. In this example, the Verification Response is in the form of an electronic message commonly referred to as E-mail and is transmitted to the Public Identification Code uniquely identifying the Transactionee, which is typically the E-mail address of the Transactionee computer 14a.

The Public Identification Code uniquely identifying the Transactionor can be provided to the Transactionee computer 14a by any suitable method known in the art. Examples of such methods include, but are not limited to, incorporating the Public Identification Code in the Transaction Initiation Request or storing the Public Identification Code on the Transactionee computer 14a prior to the Transaction Initiation Request by associating the Public Identification Code with a pre-existing account of the Transactionor.

The Public Identification Code uniquely identifying the Transactionee can be provided to the Transactionor computer 12a by any suitable method such as by incorporating the Public Identification Code in the Verification Request (E-mail message) sent to the Transactionor computer 12a by the Transactionee computer 14a.

In this embodiment, a Transactionor initiates an Electronic Transaction by inputting a Transaction Initiation Request into the Transactionor computer 12a which is electronically interconnected via a communication link with the Transactionee computer 14a. The Transaction Initiation Request requests the Electronic Transaction and includes the Transaction Identification Code. The Transactionor computer 12a then transmits the Transaction Initiation Request electronically to the Transactionee computer 14a via the communication link 20a.

The Transactionee computer 14a receives the Transaction Initiation Request transmitted by the Transactionor computer 12a. In response thereto, the Transactionee computer 14a sends a Verification Request requesting validation of the Transaction Initiation Request electronically via the communication link 24a, to the address specified in the Public Identification Code which is associated with the Transactionor computer 12a.

The Transactionor computer 12a receives the Verification Request. In response thereto, the Transactionor computer 12a sends a Verification Response either verifying the Transaction Initiation Request (indicating a valid transaction) or not verifying the Transaction Initiation Request (indicating an invalid transaction) electronically over the communication link 30a to the address specified in the Public Identification Code which is associated with the Transactionee computer 14a.

The Transactionee computer 14a receives the Verification Response. If the Verification Response sent by the Transactionor computer 12a verifies the Transaction Initiation Request, the Transactionee computer 14a examines whether the Transaction Identification Code is unexpired and effective to execute the Electronic Transaction. The Transactionee computer 14a may then send a Transaction Accomplishment Notification electronically to the address specified in the Public Identification Code identifying the Transactionor computer 12a indicating whether the Electronic Transaction was approved or not approved (denied). If the Transaction Accomplishment Notification indicates that the Electronic Transaction was approved, and the Verification Response indicates a valid transaction request then the Transactionee computer 14a executes the Electronic Transaction. However, if either the Transaction Accomplishment Notification indicates that the Electronic Transaction was not approved (or denied), or the Verification Response indicates an invalid Transaction Request then the Transactionee computer 14a denies or does not execute the Electronic Transaction.

It should be noted that the Transactionor computer 12a can either respond automatically or manually to the Transaction Verification Request sent by the Transactionee computer 14a. For example, the Transactionor computer 12a can be programmed to receive the Verification Request (E-mail message) and automatically send the Verification Response via E-mail to the Transactionee computer 14a. In this case, a Transaction Record will typically be stored on the Transactionor computer 12a when the Transactionor computer 12a transmits the Transaction Initiation Request to the Transactionee computer 14a and the Transactionor computer 12a will read the Transaction Record to determine whether to verify or not verify the Verification Request. Alternatively, the Transactionor computer 12a can be programmed to permit the Transactionor to read the Verification Request (E-mail message) and then manually send the Verification Response to the Transactionee computer 14a for verifying or not verifying the Transaction Request. The Transactionee computer 14a may wait a predetermined period of time to receive the Verification Response from the Transactionor computer 12a. If the Transactionor computer 12a does not respond within this predetermined period, the Transaction Initiation Request may be cancelled or denied by the Transactionee computer 14a.

In one other embodiment, the Transactionor computer 12a may be programmed such that, when the Transactionor inputs the Transaction Initiation Request into the Transactionor computer 12a, the Transactionor computer 12a automatically is conditioned to receive the Verification Request and automatically transmit the Verification Response in response to receiving the Verification Request. In this example, the Transactionee computer 14a also may be programmed to automatically transmit the Verification Request in response to receiving the Transaction Initiation Request.

In this embodiment, the Transactionor inputs the Transaction Initiation Request into the Transactionor computer 12a via the communication link 18a. The Transactionor computer 12a is electronically interconnected to the Transactionee computer 14a via a communication link. The Transaction Initiation Request requests the Electronic Transaction and includes the Transactionor's Transaction Identification Code.

The Transactionor computer 12a transmits electronically the Transaction Initiation Request to the Transactionee computer 14a via the communication link 20a. The Transactionee computer 14a receives the Transaction Initiation Request and before the Transactionee computer 14a executes the Electronic Transaction, the Transactionee computer 14a automatically transmits electronically a Verification Request requesting validation of the Transaction Initiation Request to the Transactionor computer 12a over the communication link 24a.

The Transactionor computer 12a receives the Verification Request. In response thereto, the Transactionor computer 12a automatically transmits electronically a Verification Response indicating one of a valid transaction and an invalid transaction to the Transactionee computer 14a over the communication link 30a.

The Transactionee computer 14a receives the Verification Response transmitted by the Transactionor computer 12a. In response thereto, the Transactionee computer 14a executes the Electronic Transaction automatically when the Verification Response indicates a valid transaction, and denies or does not execute the Electronic Transaction automatically when the Verification Response indicates an invalid transaction.

As mentioned previously, the Electronic Transaction security system 10a is envisioned for executing Electronic Transactions between a plurality of Transactionors and a plurality of Transactionees. In this embodiment, one of the Transactionors inputs a Transaction Initiation Request into one of the Transactionor computers 12a such that the specific Transactionor is associated with the Transactionor computer 12a during the Electronic Transaction. The Transaction Initiation Request requests the Electronic Transaction and includes the Transaction Identification Code identifying the Transactionor associated with the Transactionor computer 12a.

The Transactionor computer 12a transmits electronically the Transaction Initiation Request to a predetermined Transactionee computer 14a associated with a specific Transactionee via the communication link 20a. The Transactionee computer 14a receives the Transaction Initiation Request and in response thereto, the Transactionee computer 14a transmits electronically a Verification Request requesting validation of the Transaction Initiation Request to the Transactionor computer 12a via the communication link 24a.

The Transactionor computer 12a receives the Verification Request and in response thereto, the Transactionor computer 12a transmits electronically a Verification Response indicating one of a valid transaction and an invalid transaction to the Transactionee computer 14a.

The Transactionee computer 14a receives the Verification Response and in response thereto either executes the Electronic Transaction in response to receiving the Verification Response indicating a valid transaction, or denies the Electronic Transaction in response to receiving the Verification Response indicating an invalid transaction.

This process is repeated for any one of a number of predetermined times so that Electronic Transactions are executed between any one of the Transactionors and any one of the Transactionees.

While only one cycle of each process or method disclosed herein has been described in detail, it should be understood that the processes or methods disclosed herein are designed to be repeated for any one of a number of predetermined times so that Electronic Transactions can be executed between any one of the Transactionors and any one of the Transactionees.

Changes may be made in the steps or the sequence of steps of the methods described herein without departing from the spirit and the scope of the invention as defined in the following claims.

What is claimed is:

1. A method comprising the steps of:

transmitting a transaction initiation request requesting the initiation of an electronic transaction to a verifier computer from a transactionor computer, the transaction initiation request including one of a private identification code and a public identification code uniquely identifying the transactionor computer, and a public identification code uniquely identifying a transactionee computer;

receiving by the verifier computer the transaction initiation request;

transmitting a transaction request requesting processing of the electronic transaction from the verifier computer to the transactionee computer identified by the public identification code in the transaction initiation request in response to the verifier computer receiving the transaction initiation request, the transaction request including one of a private identification code and a public identification code uniquely identifying the verifier computer;

receiving the transaction request by the transactionee computer;

transmitting a verification request requesting verification of the transaction from the transactionee computer to the verifier computer in response to the transactionee computer receiving the transaction request, the verification request including one of a private identification code and a public identification code uniquely identifying the transactionee computer;

receiving the verification request by the verifier computer;

transmitting an acknowledgement request requesting acknowledgement of the electronic transaction from the verifier computer to the transactionor computer in response to the verifier computer receiving the verification request;

receiving the acknowledgement request by the transactionor computer;

transmitting an acknowledgement response indicating one of a valid electronic transaction and an invalid electronic transaction from the transactionor computer to the verifier computer in response to the transactionor computer receiving the acknowledgement request, the acknowledgement response including the private identification code uniquely identifying the transactionor computer;

receiving the acknowledgement response by the verifier computer;

transmitting a verification response indicating one of a valid electronic transaction and an invalid electronic transaction from the verifier computer to the transactionee computer in response to the verifier computer receiving the acknowledgement response; and receiving the verification response by the transactionee computer and executing the electronic transaction in response to the transactionee computer receiving the verification response indicating a valid electronic transaction.

2. The method of claim 1 further comprising the step of:

storing the transaction initiation request and the acknowledgement response by the verifier computer.

3. A method comprising the steps of:

transmitting a transaction initiation request requesting the initiation of an electronic transaction to a verifier computer from a transactionor computer, the transaction initiation request including one of a private identification code and a public identification code uniquely identifying the transactionor computer, and a public identification code uniquely identifying a transactionee computer;

receiving by the verifier computer the transaction initiation request;

transmitting automatically a transaction request requesting processing of the electronic transaction from the verifier computer to the transactionee computer identified by the public identification code in the transaction initiation request in response to the verifier computer receiving the transaction initiation request, the transaction request including a public identification code uniquely identifying the verifier computer;

receiving the transaction request by the transactionee computer;

transmitting automatically a verification request requesting verification of the transaction from the transactionee computer to the verifier computer in response to the transactionee computer receiving the transaction request, the verification request including one of a private identification code and a public identification code uniquely identifying the transactionee computer;

receiving the verification request by the verifier computer;

transmitting automatically an acknowledgement request requesting acknowledgement of the electronic transaction from the verifier computer to the transactionor computer in response to the verifier computer receiving the verification request;

receiving the acknowledgement request by the transactionor computer;

transmitting automatically an acknowledgement response indicating one of a valid electronic transaction and an invalid electronic transaction from the transactionor computer to the verifier computer in response to the transactionor computer receiving the acknowledgement request, the acknowledgement response including the private identification code uniquely identifying the transactionor computer;

receiving the acknowledgement response by the verifier computer;

transmitting automatically a verification response indicating one of a valid electronic transaction and an invalid electronic transaction from the verifier computer to the transactionee computer in response to the verifier computer receiving the acknowledgement response; and receiving the verification response by the transactionee computer and executing the electronic transaction in response to the transactionee computer receiving the verification response indicating a valid electronic transaction.

4. A method comprising the steps of:

transmitting a transaction initiation request requesting the initiation of an electronic transaction to a verifier computer from a transactionor computer, the transaction initiation request including one of a public identification code and a private identification code uniquely identifying the transactionor computer, a document, and a public identification code uniquely identifying a transactionee computer;

receiving by the verifier computer the transaction initiation request;

transmitting a transaction request requesting processing of the electronic transaction from the verifier computer to the transactionee computer identified by the public identification code in the transaction initiation request in response to the verifier computer receiving the transaction initiation request, the transaction request including a public identification code uniquely identifying the verifier computer and the document;

receiving the transaction request by the transactionee computer;

transmitting a verification request requesting verification of the transaction from the transactionee computer to the verifier computer in response to the transactionee computer receiving the transaction request, the verification request including the document, and one of a public identification code and a private identification code uniquely identifying the transactionee computer;

receiving the verification request by the verifier computer;

transmitting an acknowledgement request requesting acknowledgement of the electronic transaction from the verifier computer to the transactionor computer in response to the verifier computer receiving the verification request, the acknowledgement request including the document;

receiving the acknowledgement request by the transactionor computer;

transmitting an acknowledgement response indicating one of a valid electronic transaction and an invalid electronic transaction from the transactionor computer to the verifier computer in response to the transactionor computer receiving the acknowledgement request;

receiving the acknowledgement response by the verifier computer;

transmitting a verification response indicating one of a valid electronic transaction and an invalid electronic transaction from the verifier computer to the transactionee computer in response to the verifier computer receiving the acknowledgement response; and receiving the verification response by the transactionee computer and executing the electronic transaction in response to the transactionee computer receiving the verification response indicating a valid electronic transaction.

5. A method comprising the steps of:

transmitting a transaction initiation request requesting the initiation of an electronic transaction to a verifier computer from a transactionor computer, the transaction initiation request including a document, a public identification code uniquely identifying a transactionee computer and one of a public identification code and a private identification code uniquely identifying the transactionor computer;

receiving by the verifier computer the transaction initiation request;

transmitting automatically a transaction request requesting processing of the electronic transaction from the verifier computer to the transactionee computer identified by the public identification code in the transaction initiation request in response to the verifier computer receiving the transaction initiation request, the transaction request including a public identification code uniquely identifying the verifier computer and the document;

receiving the transaction request by the transactionee computer;

transmitting automatically a verification request requesting verification of the transaction from the transactionee computer to the verifier computer in response to the transactionee computer receiving the transaction request, the verification request including the document and one of a public identification code and a private identification code uniquely identifying the transactionee computer;

receiving the verification request by the verifier computer;

transmitting automatically an acknowledgement request requesting acknowledgement of the electronic transaction from the verifier computer to the transactionor computer in response to the verifier computer receiving the verification request, the acknowledgement request including the document;

receiving the acknowledgement request by the transactionor computer;

transmitting automatically an acknowledgement response indicating one of a valid electronic transaction and an invalid electronic transaction from the transactionor computer to the verifier computer in response to the transactionor computer receiving the acknowledgement request;

receiving the acknowledgement response by the verifier computer;

transmitting automatically a verification response indicating one of a valid electronic transaction and an invalid electronic transaction from the verifier computer to the transactionee computer in response to the verifier computer receiving the acknowledgement response; and receiving the verification response by the transactionee computer and executing the electronic transaction in response to the transactionee computer receiving the verification response indicating a valid electronic transaction.

6. A method comprising the steps of:

transmitting a transaction initiation request requesting the initiation of an electronic transaction to a transactionee computer from a transactionor computer, the transaction initiation request including a public identification code uniquely identifying the transactionor computer, and a public identification code uniquely identifying a transactionee computer;

receiving by the transactionee computer the transaction initiation request;

transmitting a verification request requesting verification of the transaction from the transactionee computer to a verifier computer in response to the transactionee computer receiving the transaction initiation request, the verification request including one of a private identification code and a public identification code uniquely identifying the transactionee computer and the public identification code uniquely identifying the transactionor computer;

receiving the verification request by the verifier computer;

transmitting an acknowledgement request requesting acknowledgement of the electronic transaction from the verifier computer to the transactionor computer in response to the verifier computer receiving the verification request;

receiving the acknowledgement request by the transactionor computer;

transmitting an acknowledgement response indicating one of a valid electronic transaction and an invalid electronic transaction from the transactionor computer to the verifier computer in response to the transactionor computer receiving the acknowledgement request, the acknowledgement response including the private identification code uniquely identifying the transactionor computer;

receiving the acknowledgement response by the verifier computer;

transmitting a verification response indicating one of a valid electronic transaction and an invalid electronic transaction from the verifier computer to the transactionee computer in response to the verifier computer receiving the acknowledgement response; and receiving the verification response by the transactionee computer and executing the electronic transaction in response to the transactionee computer receiving the verification response indicating a valid electronic transaction.

7. A method comprising the steps of:

transmitting a transaction initiation request requesting the initiation of an electronic transaction to a transactionee computer from a transactionor computer, the transaction initiation request including a public identification code uniquely identifying the transactionor computer, and a public identification code uniquely identifying a transactionee computer;

receiving by the transactionee computer the transaction initiation request;

transmitting automatically a verification request requesting verification of the transaction from the transactionee computer to a verifier computer in response to the transactionee computer receiving the transaction initiation request, the verification request including one of a private identification code and a public identification code uniquely identifying the transactionee computer and the public identification code uniquely identifying the transactionor computer;

receiving the verification request by the verifier computer;

transmitting automatically an acknowledgement request requesting acknowledgement of the electronic transaction from the verifier computer to the transactionor computer in response to the verifier computer receiving the verification request;

receiving the acknowledgement request by the transactionor computer;

transmitting automatically an acknowledgement response indicating one of a valid electronic transaction and an invalid electronic transaction from the transactionor computer to the verifier computer in response to the transactionor computer receiving the acknowledgement request, the acknowledgement response including the private identification code uniquely identifying the transactionor computer;

receiving the acknowledgement response by the verifier computer;

transmitting automatically a verification response indicating one of a valid electronic transaction and an invalid electronic transaction from the verifier computer to the transactionee computer in response to the verifier computer receiving the acknowledgement response; and receiving the verification response by the transactionee computer and executing the electronic transaction in response to the transactionee computer receiving the verification response indicating a valid electronic transaction.

\* \* \* \* \*